United States Patent
Lee et al.

(10) Patent No.: US 10,310,162 B2
(45) Date of Patent: Jun. 4, 2019

(54) OPTICAL COMPONENT AND DISPLAY DEVICE HAVING THE SAME

(71) Applicant: Samsung Display Co., Ltd., Yongin-Si, Gyeonggi-Do (KR)

(72) Inventors: Hyunwoo Lee, Anyang-si (KR); Yongkyu Kang, Hwaseong-si (KR); Sunhee Oh, Anyang-si (KR); Kang-woo Lee, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 15/361,977

(22) Filed: Nov. 28, 2016

(65) Prior Publication Data

US 2017/0153378 A1    Jun. 1, 2017

(30) Foreign Application Priority Data

Dec. 1, 2015 (KR) .................. 10-2015-0170152

(51) Int. Cl.
*F21V 8/00* (2006.01)

(52) U.S. Cl.
CPC ........... *G02B 6/0055* (2013.01); *G02B 6/005* (2013.01); *G02B 6/0058* (2013.01); *G02B 6/0036* (2013.01); *G02B 6/0051* (2013.01); *G02B 6/0053* (2013.01)

(58) Field of Classification Search
CPC .... G02B 6/005; G02B 6/0051; G02B 6/0053; G02B 6/0055
See application file for complete search history.

(56) References Cited

U.S. PATENT DOCUMENTS

| 5,771,328 | A | * | 6/1998 | Wortman | .................. | F21V 5/02 349/62 |
| 5,863,114 | A | * | 1/1999 | Nagatani | .................. | F21V 5/02 362/23.16 |
| 6,396,634 | B1 | * | 5/2002 | Ishikawa | ................ | G02B 5/045 349/64 |
| 6,478,438 | B1 | * | 11/2002 | Ishikawa | .............. | G02B 6/0051 349/64 |

(Continued)

FOREIGN PATENT DOCUMENTS

| JP | 2000249836 A | 9/2000 |
| JP | 2010135219 A | 6/2010 |

(Continued)

*Primary Examiner* — Alexander K Garlen
(74) *Attorney, Agent, or Firm* — Cantor Colburn LLP (57) ABSTRACT

A display device includes a display panel, a light source, and an optical component including a light guide film and an optical sheet. The optical sheet is coupled to the light guide film to control a path of a light emitted from the light guide film. The optical sheet includes a base film, main optical patterns, and sub-optical patterns. The main optical patterns are disposed between the base film and the light guide film and coupled to the base film and the light guide film. Each of the main optical patterns includes a side surface inclined with respect to the light guide film. The sub-optical patterns are disposed between the base film and the light guide film, coupled to the base film, and spaced apart from the light guide film. Each of the sub-optical patterns has a side surface inclined with respect to the light guide film.

20 Claims, 10 Drawing Sheets

(56) References Cited

U.S. PATENT DOCUMENTS

| | | | |
|---|---|---|---|
| 2005/0280752 A1* | 12/2005 | Kim | G02B 5/0221 349/62 |
| 2007/0247872 A1* | 10/2007 | Lee | G02B 6/0025 362/616 |
| 2008/0259634 A1* | 10/2008 | Mi | B29D 11/00663 362/606 |
| 2010/0085735 A1* | 4/2010 | Kim | G02B 5/02 362/97.2 |
| 2016/0187564 A1* | 6/2016 | Kim | G02B 6/0046 362/607 |
| 2017/0123262 A1* | 5/2017 | Lee | G02B 6/0055 |

FOREIGN PATENT DOCUMENTS

| | | |
|---|---|---|
| KR | 1020150015319 A | 2/2015 |
| KR | 1020150062799 A | 6/2015 |

* cited by examiner

OPTICAL COMPONENT AND DISPLAY DEVICE HAVING THE SAME

This application claims priority to Korean Patent Application No. 10-2015-0170152, filed on Dec. 1, 2015, and all the benefits accruing therefrom under 35 U.S.C. § 119, the content of which in its entirety is herein incorporated by reference.

BACKGROUND

1. Field

The disclosure relates to an optical component and a display device including the optical component. More particularly, the disclosure relates to an optical component for controlling a traveling direction of light provided from a light source and a display device including the optical component.

2. Description of the Related Art

A liquid crystal display device typically includes a backlight assembly and a display panel for displaying an image using a light provided from the backlight assembly. The backlight assembly may include a light emitting unit, a light guide plate, and optical sheets that control a path of the light exiting from the light guide plate.

The light guide plate guides the light generated from the light emitting unit to the display panel. The optical sheets may include a diffusion sheet and a prism sheet. The diffusion sheet diffuses the light exiting from the light guide plate, and the prism sheet condenses the light exiting from the light guide plate in a front direction of the display panel.

SUMMARY

The disclosure provides an optical component including a light guide film and an optical sheet, which are integrally formed with each other.

The disclosure provides a display device having the optical component to provide an image with improved display quality.

An embodiment of the inventive concept provides an optical component including a light guide film and an optical sheet coupled to the light guide film and which controls a path of a light emitted from the light guide film. In such an embodiment, the optical sheet includes a base film, main optical patterns, and sub-optical patterns. In such an embodiment, the main optical patterns are disposed between the base film and the light guide film and coupled to the base film and the light guide film, and each of the main optical patterns includes a side surface inclined with respect to the light guide film. In such an embodiment, the sub-optical patterns are disposed between the base film and the light guide film, coupled to the base film and spaced apart from the light guide film, and each of the sub-optical patterns includes a side surface inclined with respect to the light guide film.

An embodiment of the inventive concept provides a display device including a display panel, a light source which generates a light, and an optical component disposed adjacent to the display panel and the light source. In such an embodiment, the optical component includes a light guide film and an optical sheet, the light guide film guides the light provided from the light source to the display panel, and the optical sheet is coupled to the light guide film to control a path of the light emitted from the light guide film. In such an embodiment, the optical sheet includes a base film, main optical patterns, and sub-optical patterns. In such an embodiment, the main optical patterns are disposed between the base film and the light guide film and coupled to the base film and the light guide film, and each of the main optical patterns includes a side surface inclined with respect to the light guide film. In such an embodiment, the sub-optical patterns are disposed between the base film and the light guide film, coupled to the base film and spaced apart from the light guide film. In such an embodiment, each of the sub-optical patterns includes a side surface inclined with respect to the light guide film.

According to embodiments described herein, the amount of the light traveling in the diagonal direction of the light guide film is reduced due to the structures of the main optical patterns and the sub-optical patterns in the optical component in which the light guide film and the optical sheets are integrally formed with each other. Therefore, brightness and contrast ratio in the front direction of the display device employing the optical component may be effectively prevented from being deteriorated due to the light traveling in the diagonal direction.

In such embodiments, where the optical component includes the light guide film and the optical sheets, which are integrally formed with each other, and the main optical patterns are designed in consideration of deviations between angles of the light incident to the main optical patterns, deviations of the total reflection angles may be reduced by the main optical patterns.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. Like numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiment of the disclosure will be described in detail with reference to the accompanying drawings.

Figure 1:
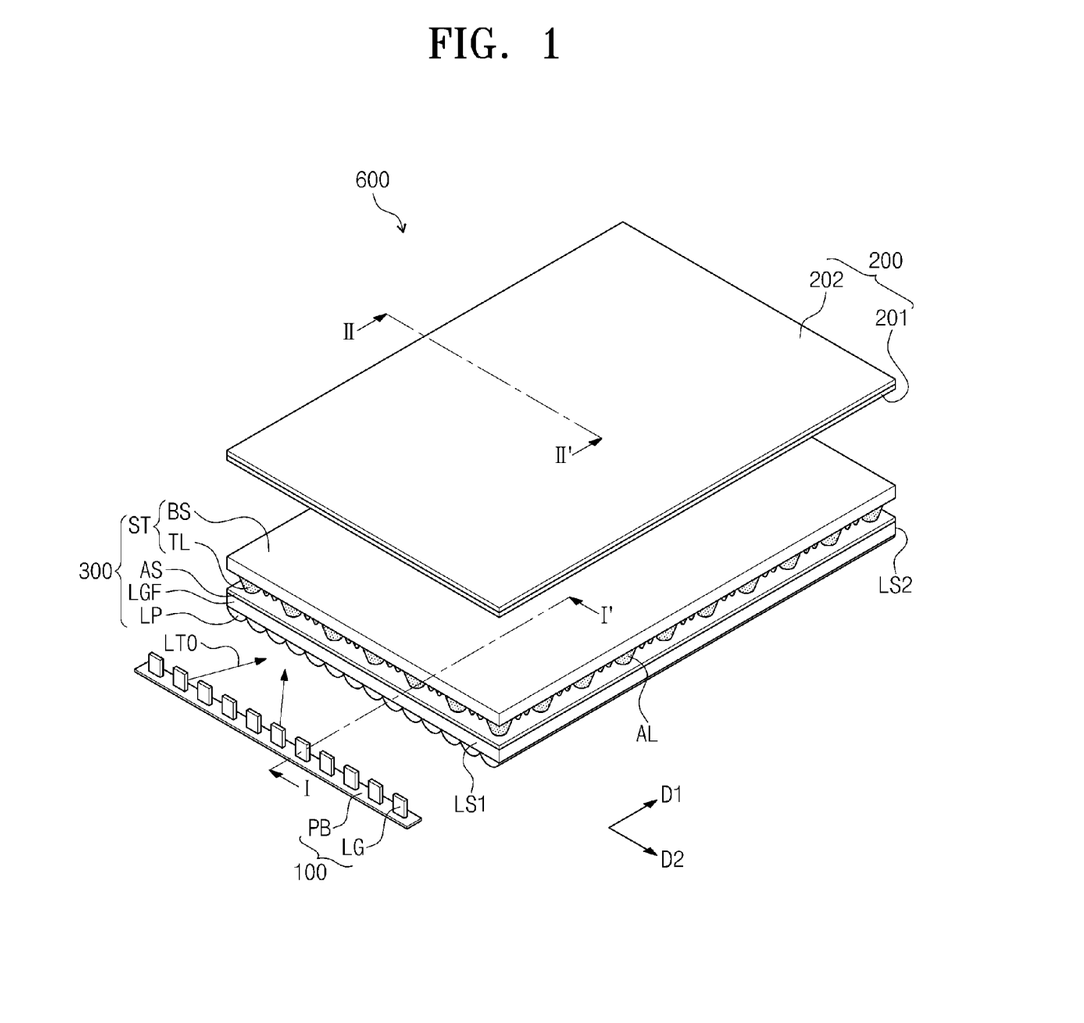
FIG. 1 is an exploded perspective view showing a display device according to an exemplary embodiment of the disclosure.
Figure 2:
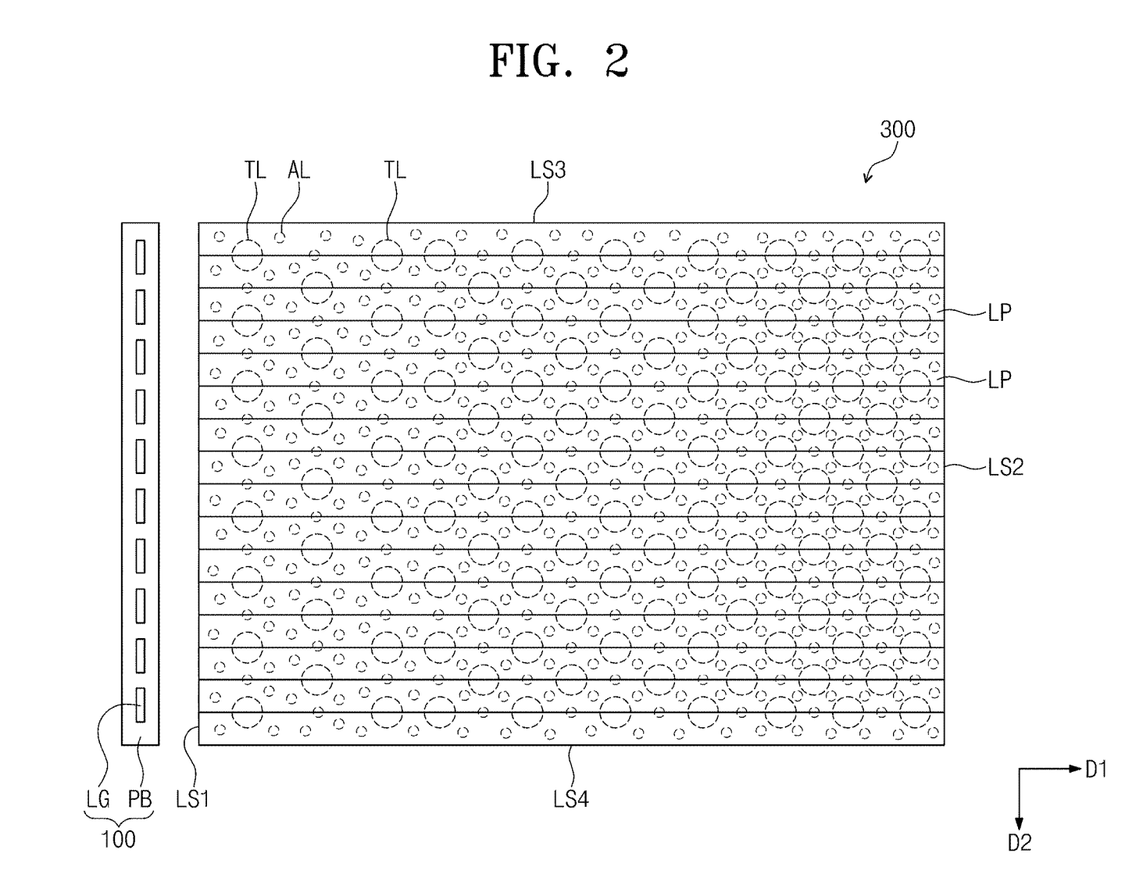
FIG. 2 is a plan view showing a rear surface of an optical component shown in FIG. 1.
Figure 3A:
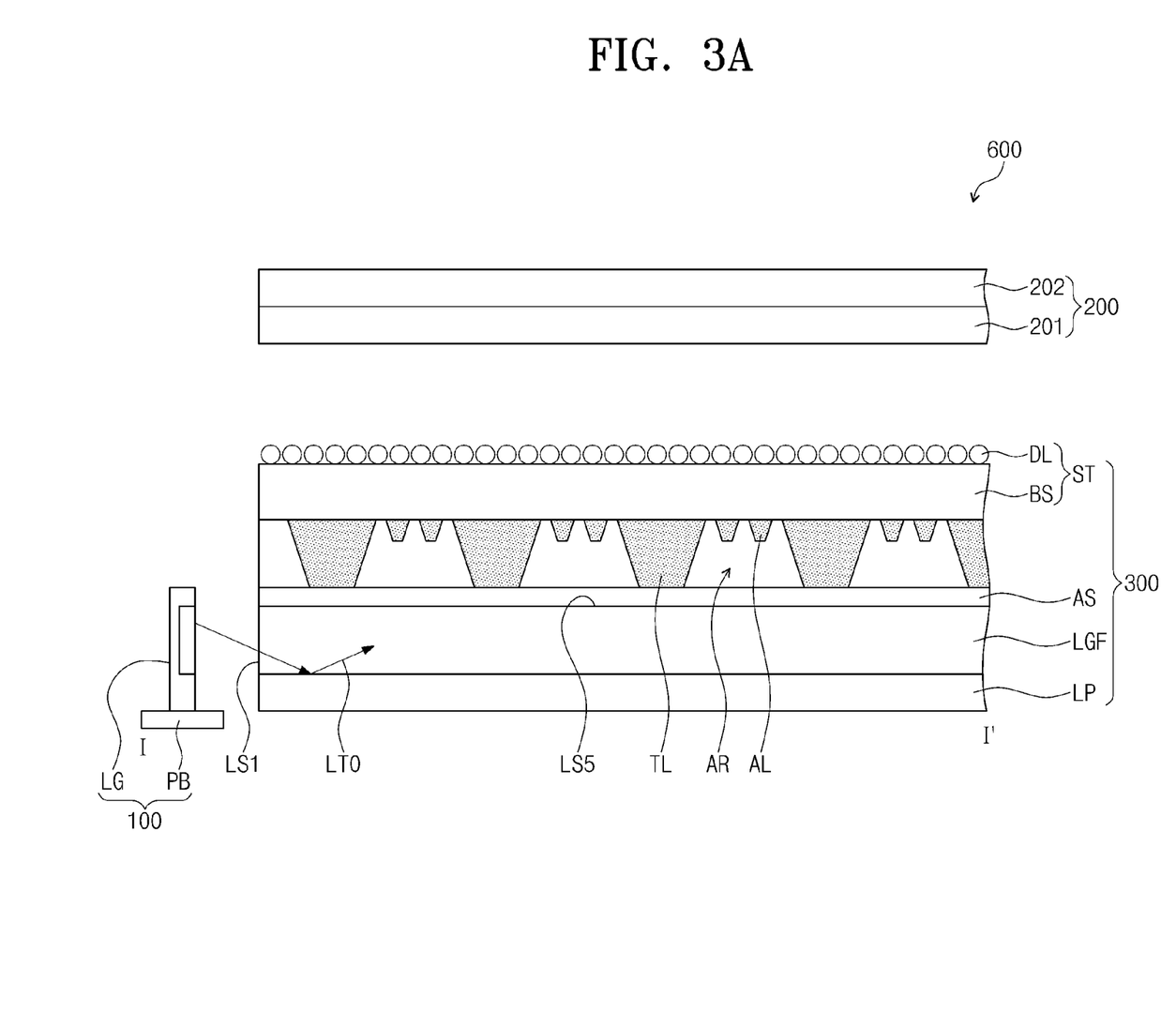
FIG. 3A is a cross-sectional view taken along line I-I' of FIG. 1.
Figure 3B:
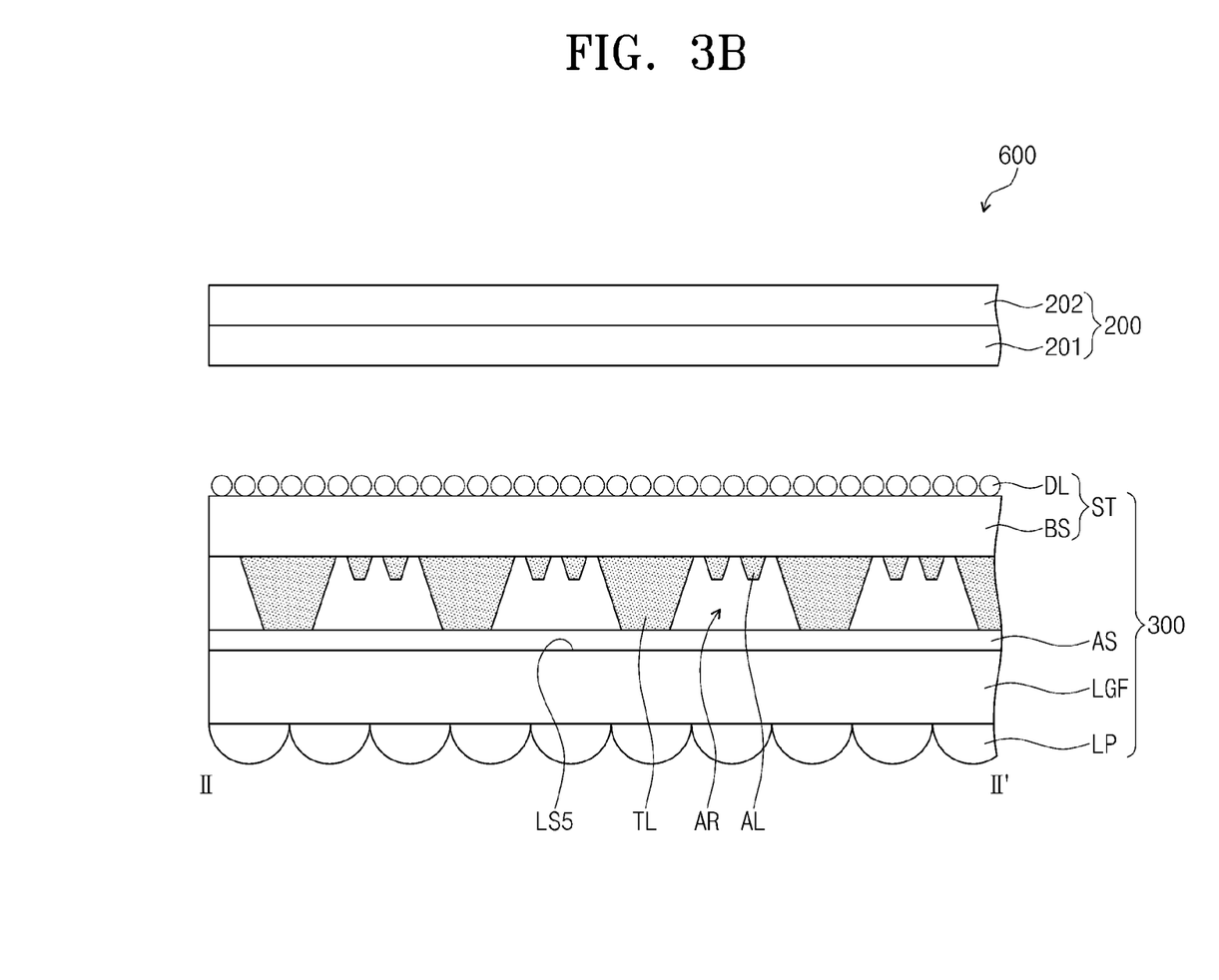
FIG. 3B is a cross-sectional view taken along line II-II' of FIG. 1.

FIG. 1 is an exploded perspective view showing a display device 600 according to an exemplary embodiment of the disclosure, FIG. 2 is a plan view showing a rear surface of an optical component 300 shown in FIG. 1, FIG. 3A is a cross-sectional view taken along line I-I' of FIG. 1, and FIG. 3B is a cross-sectional view taken along line II-II' of FIG. 1.

Referring to FIGS. 1, 2, 3A, and 3B, an exemplary embodiment of the display device 600 may be, but not limited to, a liquid crystal display device. In such an embodiment, the display device 600 includes a display panel 200, a light emitting unit 100, and the optical component 300.

The display panel 200 displays an image using a light generated by the light emitting unit 100. In an exemplary embodiment, the display panel 200 may be, but not limited to, a liquid crystal display panel. In such an embodiment, the display panel 200 includes a first display substrate 201, a second display substrate 202 disposed opposite to the first display substrate 201, and a liquid crystal layer (not shown) interposed between the first display substrate 201 and the second display substrate 202.

The first display substrate 201 includes a plurality of pixel electrodes (not shown) disposed to correspond to a plurality of pixel areas in a one-to-one correspondence, and the second display substrate 202 includes a common electrode (not shown) disposed to face the pixel electrodes such that the liquid crystal layer is interposed between the pixel electrodes and the common electrode. However, the structure of the first and second display substrates 201 and 202 are not limited thereto or thereby. In one alternative exemplary embodiment, for example, the first display substrate 201 may include the pixel electrodes and the common electrode. In such an embodiment, where the first display substrate 201 includes the common electrode, the common electrode is disposed spaced apart from the pixel electrodes, and thus the display panel 200 is operated in a plane-to-line switching ("PLS") mode.

The light emitting unit 100 includes a driving circuit board PB and a plurality of light sources LG disposed or mounted on the driving circuit board PB. The light sources LG are arranged along a side surface of the optical component 300, and each of the light sources LG may include, but not limited to, a light emitting diode package. The light sources LG receive a source voltage from the driving circuit board PB to generate the light LT0.

The optical component 300 includes a light guide film LGF, light condensing layers LP, an adhesive layer AS, and an optical sheet ST. The optical component 300 provides the light LT0 generated from the light sources LG to the display panel 200.

In an exemplary embodiment, the light guide film LGF includes a polymer material, and the light guide film LGF has a film shape with flexibility. As an example, the light guide film LGF may include polyethylene terephthalate ("PET"), polymethyl methacrylate "(PMMA")" or poly carbonate ("PC"), for example, and the light guide film LGF may have a thickness in a range from about 100 micrometers to about 500 micrometers.

In an exemplary embodiment, as shown in FIGS. 1 to 3B, the light guide film LGF includes an incident surface LS1, an opposite surface LS2 facing the incident surface LS1, a first connection surface LS3, a second connection surface LS4, and an exit surface LS5. The light LT0 from the light sources LG is incident to the light guide film LGF through the incident surface LS1, and the light LT0 incident to the light guide film LGF exits to outside the light guide film LGF through the exit surface LS5. The first connection surface LS3 connects the incident surface LS1 to the opposite surface LS2, and the second connection surface LS4 faces the first connection surface LS3 and connects the incident surface LS1 to the opposite surface LS2.

The light condensing layers LP are disposed below the light guide film LGF, e.g., at a rear surface of the light guide film LGF facing the exit surface LS5. In an exemplary embodiment, each of the light condensing layers LP has a protrusion shape protruded from the rear surface of the light guide film LGF to refract or reflect the light traveling in the light guide film LGF to a front direction of the display panel 200.

In an exemplary embodiment, each of the light condensing layers LP may have a prism shape or a lenticular shape. When a direction from the incident surface LS1 to the opposite surface LS2 is defined as a first direction D1 and a direction substantially perpendicular to the first direction D1 is defined as a second direction D2, each of the light condensing layers LP extends in the first direction D1. Accordingly, each of the light condensing layers LP has a lengthwise direction in the first direction D1 and a widthwise direction in the second direction D2.

In an exemplary embodiment, the display device 600 may further include a reflection member (not shown) disposed to face the display panel 200 such that the optical component 300 is disposed between the reflection member and the display panel 200. The reflection member reflects a light leaked from the rear surface of the light guide film LGF. According to an alternative exemplary embodiment, the reflection member may be omitted, and the rear surface of the light guide film LGF may be coated with a reflection material.

The adhesive layer AS is disposed on the light guide film LGF to bond the optical sheet ST to the light guide film LGF. In such an embodiment, the light guide film LGF and the optical sheet ST are coupled to each other by the adhesive layer AS, and thus the light guide film LGF and the optical sheet ST may be combined or integrated with each other in the optical component 300.

The adhesive layer AS includes an adhesive material having a light transmittance. In one exemplary embodiment, for example, the adhesive layer AS may include, but not limited to, an optical clear adhesive ("OCA").

The optical sheet ST includes a base film BS, main optical patterns TL, sub-optical patterns AL, and a diffusion layer DL.

The base film BS has a light transmittance and a flexibility. In an exemplary embodiment, the base film BS includes a polymer material, e.g., PET, PMMA, PC, etc., and the base film BS has a film shape with a thickness in a range from about tens of micrometers to about hundreds of micrometers.

The main optical patterns TL may include a polymer having a light transmittance, such as PET, PEN, PC, PMMA, etc., as a composition material thereof. The main optical patterns TL may be disposed between the base film BS and the light guide film LGF, and the main optical patterns TL may be coupled to the base film BS and the light guide film LGF.

The light LT0, which is totally reflected in the light guide film LGF, is incident to the main optical patterns TL, and the light LT0 incident to the main optical patterns TL exits outside the optical component 300 through the base film BS and the diffusion layer DL after a path, i.e., a traveling direction, thereof is changed by the main optical patterns TL. In such an embodiment, since the light LT0 is reflected by the main optical patterns TL, the traveling direction of the light LT0 is changed to the front direction of the display panel 200. Optical functions of the main optical patterns TL will be described later in greater detail with reference to FIG. 4.

In an exemplary embodiment, the main optical patterns TL may be spaced apart from each other, and an air layer AR may be defined between two adjacent main optical patterns of the main optical patterns TL. In such an embodiment, each of the main optical patterns TL has a dot shape when viewed in a plan view. In an exemplary embodiment, as shown in FIG. 2, each of the main optical patterns TL has a circular shape, but not being limited thereto or thereby. In one alternative exemplary embodiment, for example, each of the main optical patterns TL may have the dot shape. In such an embodiment, each of the main optical patterns TL may have a polygonal dot shape, for example.

In such an embodiment, as described above, since the composition material of the main optical patterns TL includes the polymer, the main optical patterns TL have a refractive index greater than a refractive index of the air layer AR. Thus, the light LT0 exiting from the light guide film LGF is totally reflected by an interface between each of the main optical patterns TL and the air layer AR.

In such an embodiment, as described above, since the light LT0, which is totally reflected in the light guide film LGF, exits outside the optical component 300 by the main optical patterns TL, an amount of the light LT0 exiting from the light guide film LGF through the main optical patterns TL becomes great as a density of the main optical patterns TL increases in the light guide film LGF. Therefore, as shown in FIG. 2, the density of the main optical patterns LT decreases as a distance thereof from the incident surface LS1 becomes less, and the density of the main optical patterns LT increases as a distance thereof from the opposite surface LS2 becomes less.

The sub-optical patterns AL may include a polymer having a light transmittance, such as PET, PEN, PC, PMMA, etc., as a composition material thereof. In an exemplary embodiment, the composition material of the sub-optical patterns AL is the same as the composition material of the main optical patterns TL.

In an exemplary embodiment, each of the sub-optical patterns AL has a size smaller than a size of each of the main optical patterns TL. The sub-optical patterns AL may be disposed between the base film BS and the light guide film LGF, and the sub-optical patterns AL may be coupled to the base film BS. In such an embodiment, different from the main optical patterns TL, the sub-optical patterns AL may be spaced apart from the light guide film LGF.

In an exemplary embodiment, a portion of the sub-optical patterns AL is disposed between two main optical patterns of the main optical patterns TL when viewed in a plan view, and a density of the sub-optical patterns AL is greater than the density of the main optical patterns TL per a unit area of the light guide film LGF. Therefore, the haze of the optical component 300 is increased by the sub-optical patterns AL, and thus each of the main optical patterns TL may be effectively prevented from being recognized as a dot when viewed in a plan view.

The sub-optical patterns AL condense the light, which is incident to the air layer AR from the light guide film LGF among the light LT0, to the front direction of the display panel 200. Optical functions of the sub-optical patterns AL will be described later in greater with reference to FIG. 4.

The diffusion layer DL is disposed on the base film BS to diffuse the light LT0, and the diffusion layer DL is disposed opposite to the main optical patterns TL and the sub-optical patterns AL such that the base film BS is interposed between the diffusion layer DL and the main and sub-optical patterns TL and AL. The diffusion layer DL may include a binder and diffusion particles dispersed in the binder. The diffusion particles may include a transflective material, such as titanium oxide ($TiO_2$) and aluminum oxide ($Al_2O_3$), for example.

Hereinafter, the structure and function of the main optical patterns TL and the sub-optical patterns AL will be described with reference to FIG. 4.

Figure 4:
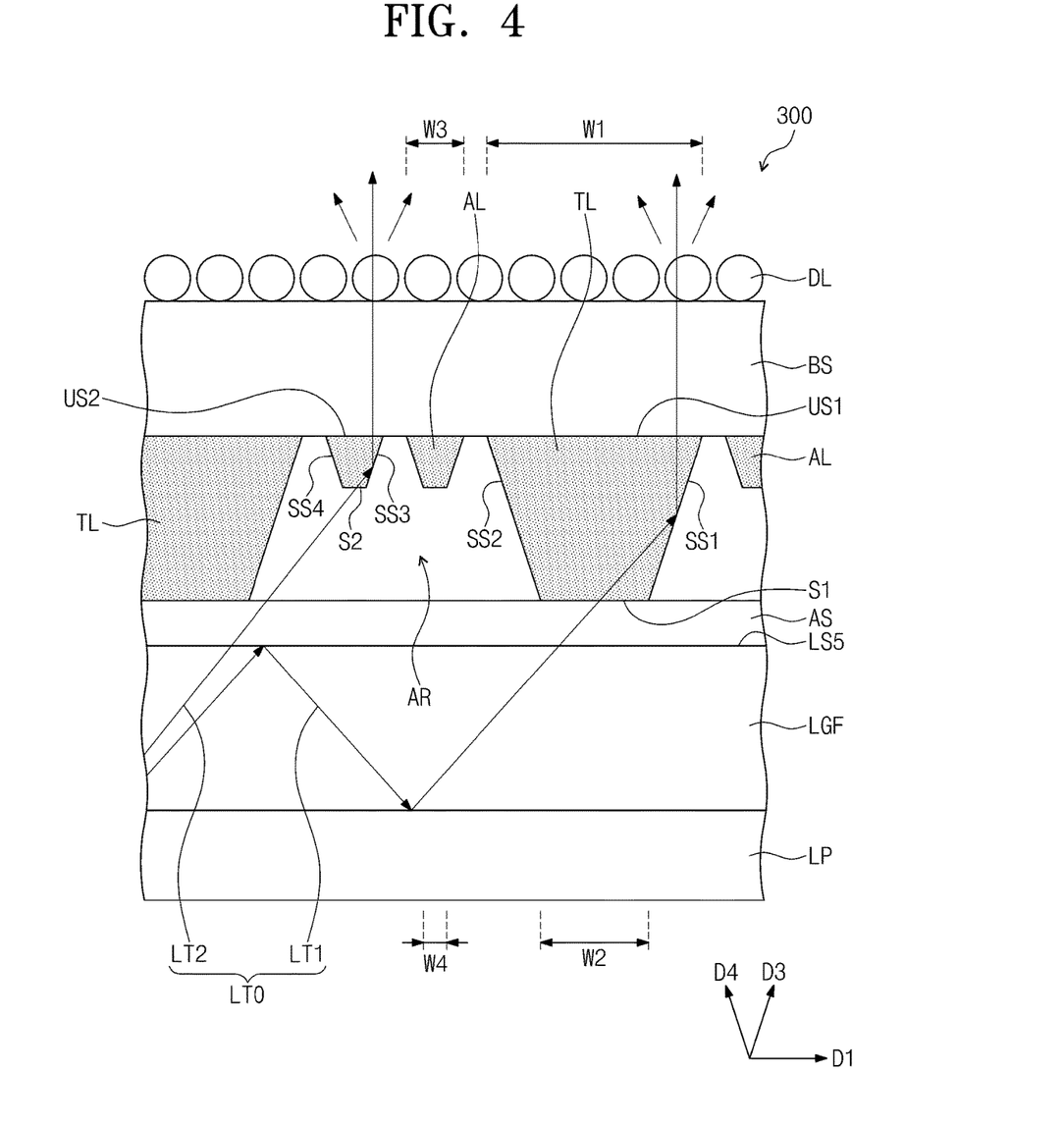
FIG. 4 is an enlarged cross-sectional view showing a portion of main optical patterns and a portion of sub-optical patterns shown in FIG. 3A.

FIG. 4 is an enlarged cross-sectional view showing a portion of the main optical patterns TL and a portion of the sub-optical patterns AL shown in FIG. 3A. In an exemplary embodiment, the main optical patterns TL have the same structure and optical function with each other, and the sub-optical patterns AL have the same structure and optical function with each other. Thus, only one main optical pattern of the main optical patterns TL and only one sub-optical pattern of the sub-optical patterns AL will hereinafter be described in detail, and any repetitive detailed descriptions on remaining main optical patterns TL and remaining sub-optical patterns AL will be omitted for convenience of description.

Referring to FIGS. 3A and 4, in an exemplary embodiment, the main optical pattern TL includes a first upper surface US1, a first lower surface S1, a first side surface SS1, and a second side surface SS2. The first upper surface US1 makes contact with the base film BS, and the first lower surface S1 makes contact with the adhesive layer AS. In such an embodiment, the first upper surface US1 overlaps the base film BS by a first width W1, and the first lower surface S1 overlaps the adhesive layer AS by a second width W2, when viewed from a plan view in a thickness direction of the optical component 300.

In an exemplary embodiment, the main optical pattern TL has a tapered shape. Thus, a width of the main optical pattern TL increases as a distance from the first upper surface US1 becomes less, and the width of the main optical pattern TL decreases as a distance from the first lower surface S1 becomes less. In such an embodiment, the first width W1 may be a maximum width of the main optical pattern TL, and the second width W2 may be a minimum width of the main optical pattern TL.

In an exemplary embodiment, the first and second side surfaces SS1 and SS2 are inclined with respect to each of the first upper surface US1 and the first lower surface S1. In such an embodiment, when viewed in a cross-sectional view, the first side surface SS1 is substantially parallel to a third direction D3 and the second side surface SS2 is substantially parallel to a fourth direction D4, which is substantially perpendicular to the third direction D3, as shown in FIG. 4.

In an exemplary embodiment, the sub-optical pattern AL includes a second upper surface US2, a second lower surface S2, a third side surface SS3, and a fourth side surface SS4. The second upper surface US2 makes contact with the base film BS, and the second lower surface S2 is spaced apart from the adhesive layer AS. Therefore, the air layer AR is defined between the second lower surface LS2 of the sub-optical pattern AL and the adhesive layer AS. In such an embodiment, the second upper surface US2 overlaps the base film BS by a third width W3, and the second lower surface S2 is overlaps the base film BS by a fourth width W4, when viewed from a plan view in a thickness direction of the optical component 300.

In an exemplary embodiment, the sub-optical pattern AL has a tapered shape. Thus, a width of the sub-optical pattern AL increases as a distance from the second upper surface US2 becomes less, and the width of the sub-optical pattern AL decreases as a distance from the second lower surface S2 becomes less. In such an embodiment, the third width W3 may be a maximum width of the sub-optical pattern AL, and the fourth width W4 may be a minimum width of the sub-optical pattern AL.

In an exemplary embodiment, the third and fourth side surfaces SS3 and SS4 are inclined with respect to each of the second upper surface US2 and the second lower surface S2. In such an embodiment, when viewed in a cross-sectional view, the third side surface SS3 is substantially parallel to the third direction D3 and the fourth side surface SS4 is substantially parallel to the fourth direction D4, as shown in FIG. 4.

In an exemplary embodiment, the sub-optical pattern has a size smaller than a size of the main optical pattern TL. In such an embodiment, the third width W3 is smaller than the first width W1, and the fourth width W4 is smaller than the second width W2.

Hereinafter, the optical functions of the main optical pattern TL and the sub-optical pattern AL will be described. For the convenience of description, the light LT0, which may be totally reflected in the light guide film LGF, is divided into a first light LT1 and a second light LT2.

The first light LT1 is the light incident to the main optical pattern TL through the adhesive layer AS after being totally reflected in the light guide film LGF. Since each of the light guide film LGF, the adhesive layer AS and the main optical pattern TL includes the polymer material and has the similar refractive index to each other, the first light LT1 may transmit through an interface between the light guide film LGF and the adhesive layer AS and an interface between the adhesive layer AS and the main optical pattern TL without being refracted.

After the first light LT1 is incident to the main optical pattern TL, the first light LT1 is reflected by the first side surface SS1 of the main optical pattern TL. As described above, since the first side surface SS1 makes contact with the air layer AR, which has a refractive index smaller than that of the main optical pattern TL, the first light LT1 may be totally reflected by the first side surface SS1.

In addition, since the first side surface SS1 extends in the third direction D3 inclined with respect to each of the first upper surface US1 and the first lower surface LS1 when viewed in a cross-sectional view, the first light LT1, which is totally reflected by the first side surface SS1, may be condensed in a substantially front direction of the optical component 300 and the display panel 200.

The first light LT1 travels to the diffusion layer DL after the first light LT1 is totally reflected by the main optical pattern TL. The first light LT1 finally exits from the optical component 300 after the first light LT1 is diffused while transmitting through the diffusion layer DL.

The second light LT2 is incident to the air layer AR through the adhesive layer AS after being totally reflected in the light guide film LGF. That is, different from the first light LT1 incident to the main optical pattern TL, the second light LT2 is incident to the air layer AR after exiting from the light guide film LGF without being incident to the main optical pattern TL.

The second light LT2 is incident to the sub-optical pattern AL after the second light LT2 is incident to the air layer AR. After the second light LT2 is incident to the sub-optical pattern AL, the second light LT2 is reflected by the third side surface SS3. Since the third side surface SS3 makes contact with the air layer AR having a refractive index smaller than that of the sub-optical pattern AL, the second light LT2 may be totally reflected by the third side surface SS3.

In addition, since the third side surface SS3 is inclined with respect to each of the second upper surface US2 and the second lower surface LS2 when viewed in a cross-sectional view, the second light LT2, which is totally reflected by the third side surface SS3, may be condensed in the substantially front direction of the optical component 300 and the display panel 200. After the second light LT2 is totally reflected by the sub-optical pattern AL, the second light LT2 may transmit through the diffusion layer DL to be diffused, and the second light LT2 may be finally emitted from the optical component 300.

In a conventional display device, where the sub-optical pattern AL is not provided in the optical component 300, the second light LT2 is not incident to the main optical pattern TL, and thus the second light LT2 may not be condensed in the front direction of the optical component 300. However, according to an exemplary embodiment, where the sub-optical pattern AL is provided in the optical component 300, the sub-optical pattern AL may effectively condense the second light LT2 in the front direction of the optical component 300.

Figure 5:
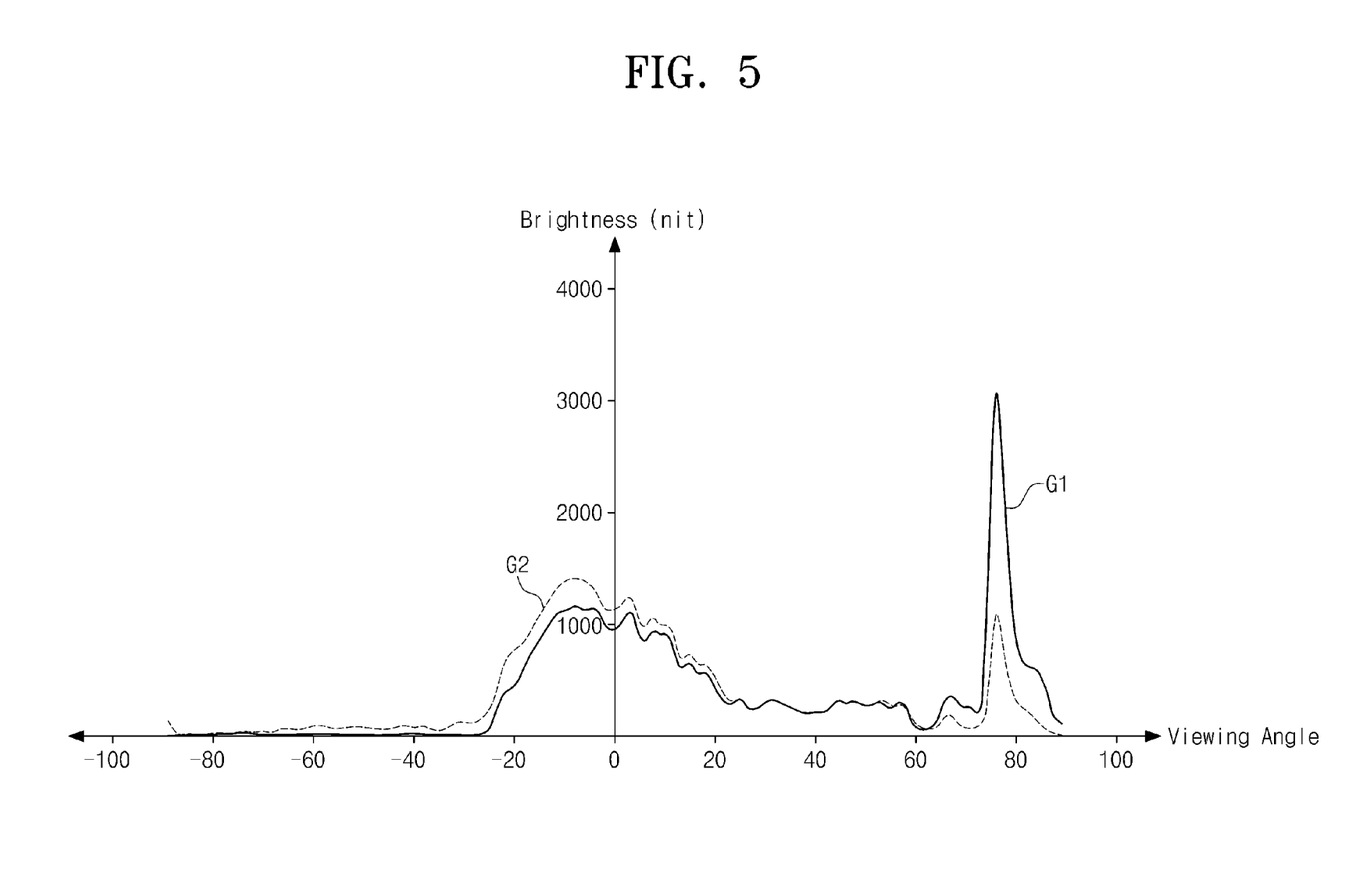
FIG. 5 is a graph showing an effect of the sub-optical pattern shown in FIG. 4.

FIG. 5 is a graph showing an effect of the sub-optical pattern AL shown in FIG. 4.

Referring to FIGS. 4 and 5, a first graph G1 in FIG. 5 shows a comparison example. In FIG. 5, the first graph G1 shows a brightness of the display panel 200 (refer to FIG. 1) as a function of a viewing angle of the display device 600 (refer to FIG. 1) when the sub-optical pattern AL is omitted from the optical component 300, and a second graph G2 in FIG. 5 shows a brightness of the display panel 200 (refer to FIG. 1) as a function of the viewing angle of the display device 600 (refer to FIG. 1) when the sub-optical pattern AL is included in the optical component 300 according to an exemplary embodiment of the disclosure.

According to the first graph G2, the brightness is measured to be about 1,300 nits when the viewing angle is about −10 degrees, and the brightness is measured to be about 1,100 nits when the viewing angle is about 77 degrees. According to the second graph G1, the brightness is measured to be about 1,100 nits when the viewing angle is about −10 degrees, and the brightness is measured to be about 3,050 nits when the viewing angle is about 77 degrees.

As shown by the first and second graphs G1 and G2, in the comparison example where the sub-optical pattern AL is omitted from the optical component 300, a brightness measured at a specific viewing angle is abnormally increased due to the light, which is not incident to the main optical pattern TL and is not condensed by the main optical pattern TL. However, according to an exemplary embodiment of the disclosure, where the optical component 300 includes the sub-optical pattern AL, the light is condensed by the sub-optical pattern AL even though the light is not incident to the main optical pattern TL. As a result, according to an exemplary embodiment of the disclosure, the brightness at the specific viewing angle is effectively prevented from being abnormally increased, and the brightness is relatively increased at the viewing angle of about zero (0) degree.

Figure 6A:
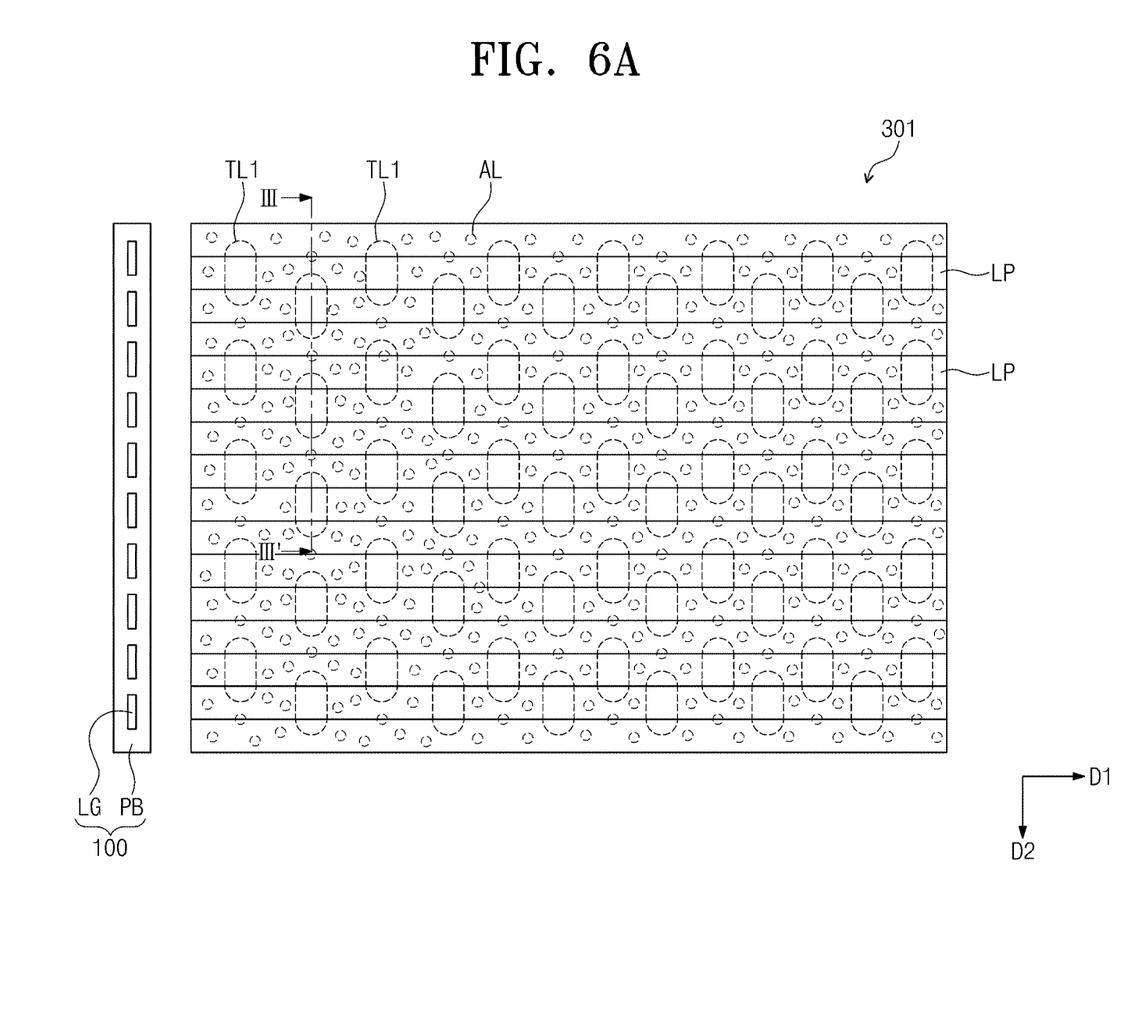
FIG. 6A is a plan view showing an optical component and a light emitting unit according to an alternative exemplary embodiment of the disclosure.
Figure 6B:
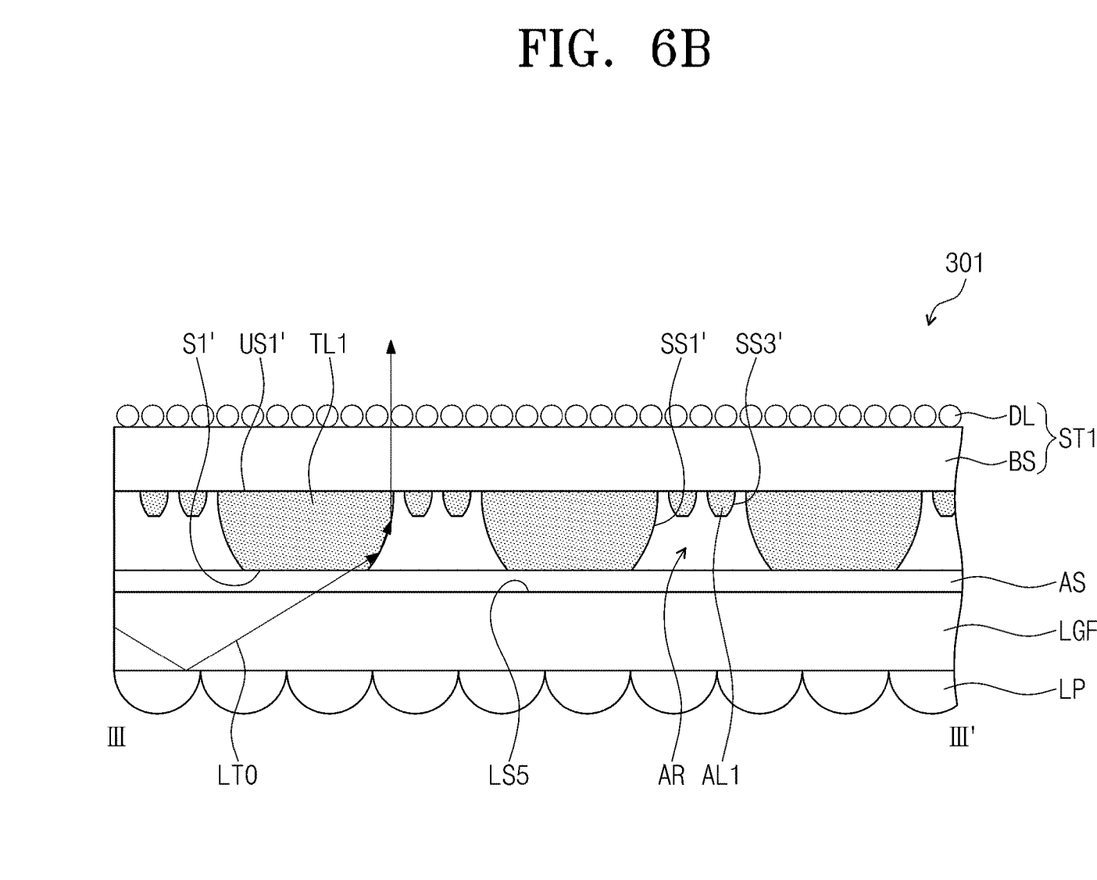
FIG. 6B is a cross-sectional view taken along line III-III' of FIG. 6A.

FIG. 6A is a plan view showing an optical component 301 and a light emitting unit 100 according to an alternative exemplary embodiment of the disclosure, and FIG. 6B is a cross-sectional view taken along line III-III' of FIG. 6A.

In FIGS. 6A and 6B, the same reference numerals denote the same elements of the exemplary embodiments described above, and thus any repetitive detailed descriptions of the same elements will hereinafter be omitted.

Referring to FIGS. 6A and 6B, in an exemplary embodiment, the optical component 301 includes a light guide film LGF, light condensing layers LP, an adhesive layer AS, and an optical sheet ST1. In such an embodiment, the optical sheet ST1 includes a base film BS, main optical patterns TL1, and sub-optical patterns AL1.

In an exemplary embodiment, as shown in FIG. 6B, a first side surface SS1' of each of the main optical patterns TL1 and a third side surface SS3' of each of the sub-optical patterns AL1 have a round shape. In such an embodiment, each of the first and third side surfaces SS1' and SS3' has the round shape convex toward an air layer AR.

In such an embodiment, the first side surface SS1' and the third side surface SS3' are substantially symmetrical to each other. Hereinafter, the first side surface SS1' will be described in detail for convenience of description. As described with reference to FIG. 4, in an exemplary embodiment where the first side surface SS1' has a substantially flat shape when viewed in a cross-sectional view, the first light LT1 (refer to FIG. 4) is totally reflected once at the first side surface SS1 (refer to FIG. 4). However, in an exemplary embodiment, where the first side surface SS1' has the round shape, the light LT0 may be totally reflected multiple times at the first side surface SS1'. Thus, although the light LT0 is incident to the main optical patterns TL1 at a gentle angle, the light LT0 may be more effectively condensed by the main optical patterns LT1.

The main optical pattern TL1 includes a first upper surface US1' and a lower surface S1', which are connected to the first side surface SS1'. In an exemplary embodiment, each of the first upper surface US1' and the first lower surface S1' has a lengthwise direction substantially parallel to a second direction D2, and each of the first upper surface US1' and the first lower surface LS1' has a widthwise direction substantially parallel to a first direction D1. In such an embodiment, as shown in FIG. 6A, each of the main optical patterns TL1 has a dot shape elongated in the second direction D2 when viewed in a plan view, and the lengthwise direction and the widthwise direction are defined at each of the first upper surface US1' and the first lower surface S1'.

Figure 7:
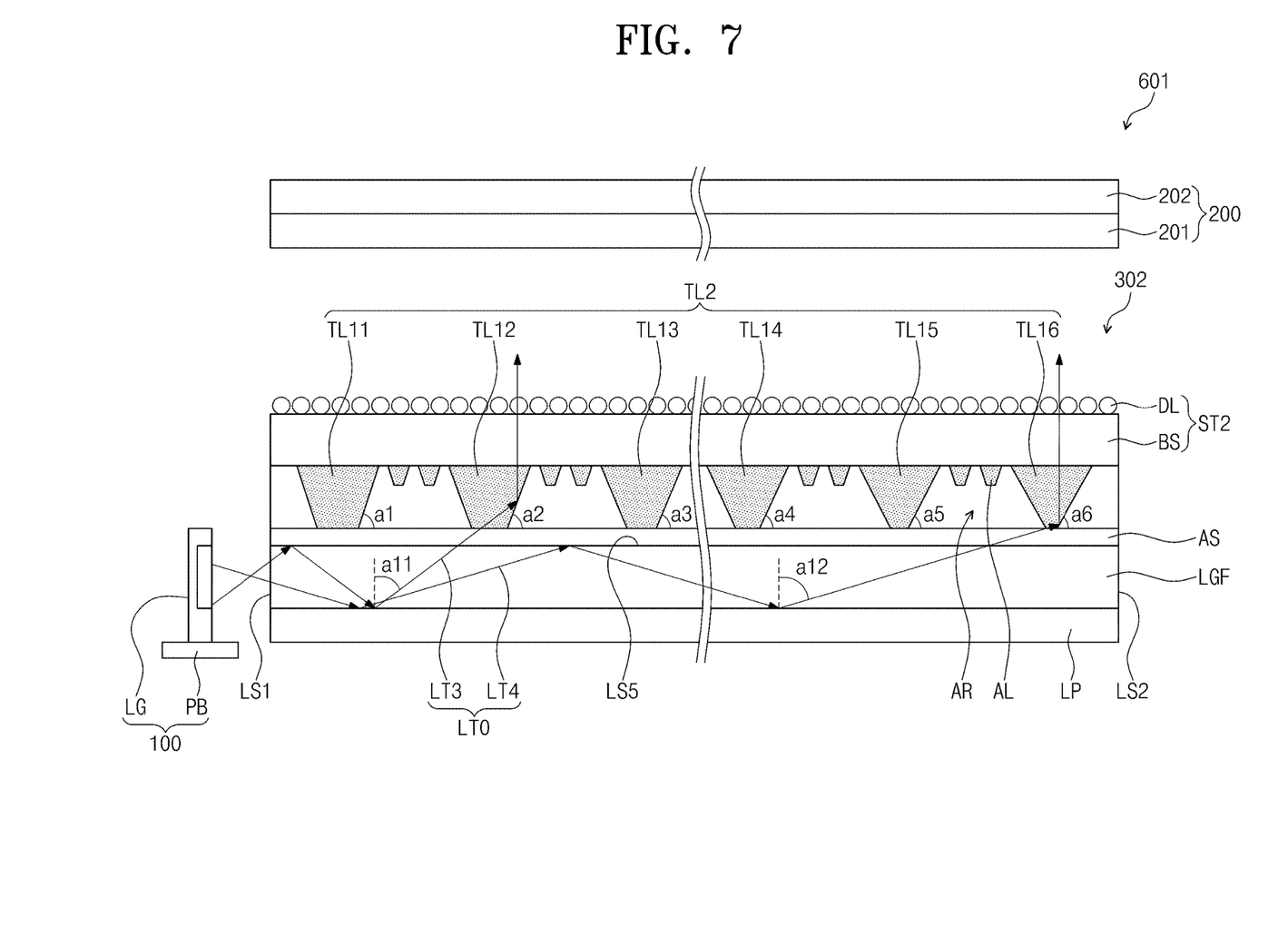
FIG. 7 is a cross-sectional view showing a display device according to an alternative exemplary embodiment of the disclosure.

FIG. 7 is a cross-sectional view showing a display device 601 according to another alternative exemplary embodiment of the disclosure. In FIG. 7, the same reference numerals denote the same elements in the exemplary embodiments described above, and thus any repetitive detailed descriptions of the same elements will hereinafter be omitted.

Referring to FIG. 7, an exemplary embodiment of the display device 601 includes a light emitting unit 100, a display panel 200 and an optical component 302, and the optical component 302 includes a light guide film LGF and an optical sheet ST2. In such an embodiment, the optical sheet ST2 includes main optical patterns TL2 and sub-optical patterns AL.

In an exemplary embodiment, side surfaces of the main optical patterns TL2, which are sequentially arranged from an incident surface LS1 to an opposite surface LS2 of the light guide film LGF, are inclined with different angles from each other with respect to the light guide film LGF. In such an embodiment, the side surfaces of the main optical patterns TL2 have an inclination angle that decreases as a distance thereof from the incident surface LS1 becomes greater.

In one exemplary embodiment, for example, the main optical patterns TL2 include first, second, third, fourth, fifth and sixth main optical patterns TL11, TL12, TL13, TL14, TL15 and TL16, and the first to sixth main optical patterns TL11 to TL16 are sequentially arranged from the incident surface LS1 to the opposite surface LS2. In such an embodiment, when first, second, third, fourth, fifth, and sixth acute angles a1, a2, a3, a4, a5, and a6 are defined by the side surfaces of the first to sixth main optical patterns TL11 to TL16 and the light guide film LGF, respectively, each of the first to sixth acute angles a1 to a6 has a degree that is gradually decreased as a distance thereof from the incident surface LS1 becomes greater. Thus, the degree of the first acute angle a1 is the greatest, and the degree of the sixth acute angle a6 is the smallest.

In such an embodiment, where the main optical patterns TL2 are provided as in described above, a condensing direction of a light LT0 becomes more uniform by the main optical patterns TL2. In such an embodiment, the light LT0 is generated from a light source LG of the light emitting unit 100, and the light LT0 is emitted from the light source LG at a predetermined radiation angle. When the light LT0 is divided into a third light LT3 and a fourth light LT4, the radiation angle of the third light LT3 is different from the radiation angle of the fourth light LT4. Accordingly, the third light LT3 and the fourth light LT4 are totally reflected in the light guide film LGF at different angles from each other after the third and fourth lights LT3 and LT4 are incident to the light guide film LGF. Therefore, the third light LT3 is incident to the second main optical pattern TL12 at a first incident angle a11, and the fourth light LT4 is incident to the sixth main optical pattern TL16 at a second incident angle a12, which is greater than the first incident angle a11. That is, when the fourth light LT4 is totally reflected in the light guide film LGF at a gentler angle than the third light LT3, the second incident angle a12 is greater than the first incident angle a11.

If the side surfaces of the first to sixth main optical patterns TL11 to TL16 are inclined at the same angle with each other with respect to the light guide film LGF, a deviation may occur between incident angles of the light LT0 incident to the first to sixth main optical patterns TL11 to TL16. Therefore, a deviation occurs between total reflection angles of the light LT0 totally reflected by the main optical patterns TL2 by the deviation of the incident angles. In an exemplary embodiment, the degrees of the first to sixth acute angles a1 to a6 are set to be different from each other as the distance thereof from the incident surface LS1 becomes greater, and thus the deviation between the total reflection angles of the light LT0 totally reflected by the main optical patterns LT2 is effectively prevented or substantially reduced.

Figure 8:
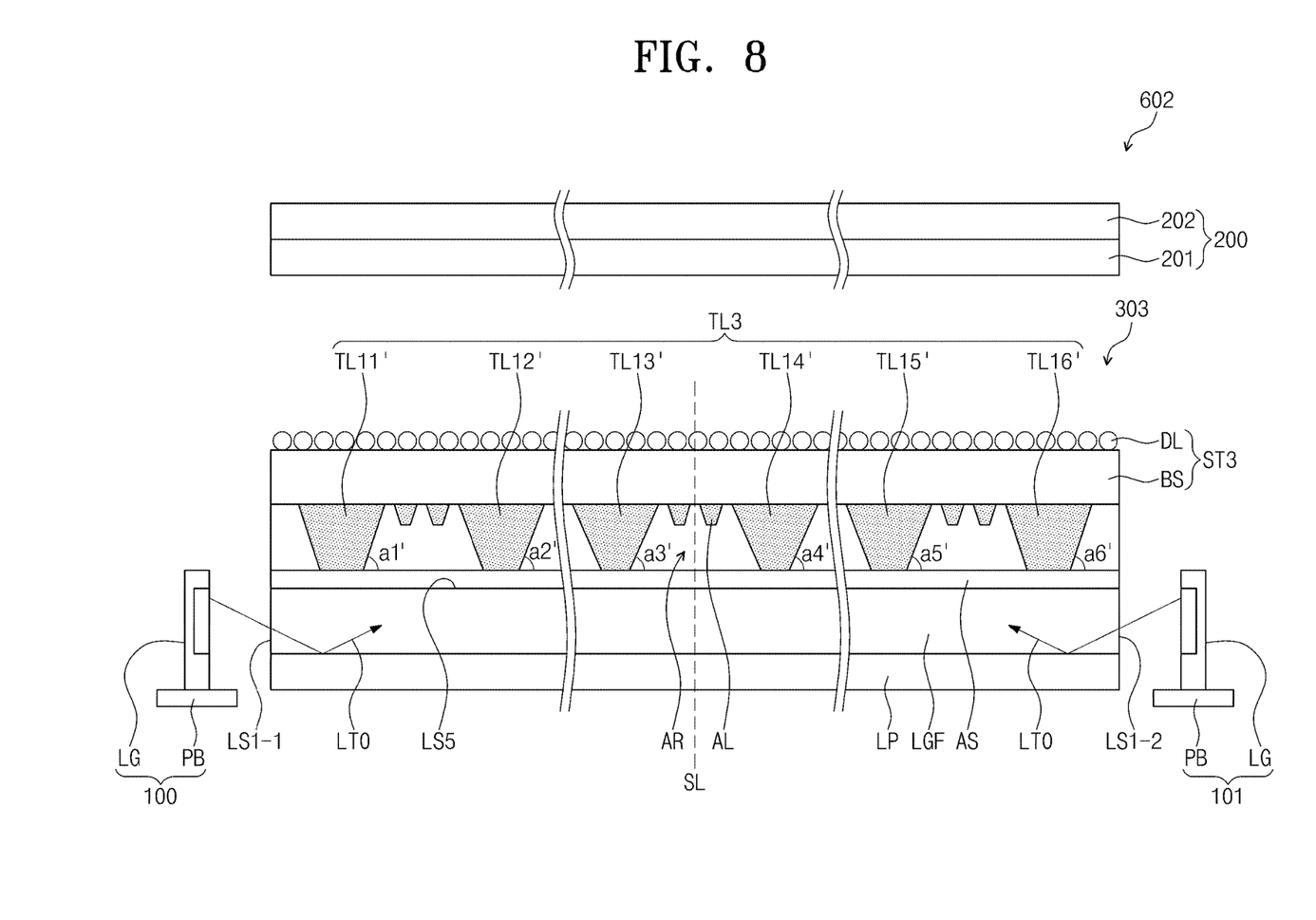
FIG. 8 is a cross-sectional view showing a display device according to another alternative exemplary embodiment of the disclosure.

FIG. 8 is a cross-sectional view showing a display device 602 according to another alternative exemplary embodiment of the disclosure. In FIG. 8, the same reference numerals denote the same elements in the exemplary embodiments described above, and thus any repetitive detailed descriptions of the same elements will hereinafter be omitted.

Referring to FIG. 8, an exemplary embodiment of the display device 602 includes a first light emitting unit 100, a second light emitting unit 101, a display panel 200 and an optical component 303, and the optical component 303 includes a light guide film LGF and an optical sheet ST3. In such an embodiment, the optical sheet ST3 includes main optical patterns TL3 and sub-optical patterns AL.

The first light emitting unit 100 is disposed at a side of the optical component 303, and the second light emitting unit 101 is disposed at another side (e.g., an opposing side) of the optical component 303. In such an embodiment, a first incident surface LS1-1 of the light guide film LGF may be defined by a surface adjacent to the first light emitting unit 100, and a second incident surface LS1-2 of the light guide film LGF may be defined by a surface adjacent to the second light emitting unit 101.

In an exemplary embodiment, side surfaces of the main optical patterns TL3 are inclined at different angles from each other with respect to the light guide film LGF when viewed in a cross-sectional view. In such an embodiment, as a distance of the main optical patterns TL3 and the light guide film LGF from a reference line SL dividing the light guide film LGF into two parts increases and a distance of the main optical patterns TL3 and the light guide film LGF from the first incident surface LS1-1 and the second incident surface LS1-2 decreases, an inclination between side surfaces of the main optical patterns TL3 and the light guide film LGF increases.

In one exemplary embodiment, for example, the main optical patterns TL3 include first, second, third, fourth, fifth and sixth main optical patterns TL11', TL12', TL13', TL14', TL15' and TL16', and the first to sixth main optical patterns TL11' to TL16' are sequentially arranged from the first incident surface LS1-1 to the second incident surface LS1-2. When first, second, third, fourth, fifth and sixth acute angles a1, a2, a3, a4, a5 and a6 are defined by the side surfaces of the first to sixth main optical patterns TL11' to TL16' and the light guide film LGF, respectively, a degree of the first acute angle a1' is greater than a degree of the second acute angle a2', the degree of the second acute angle a2' is greater than a degree of the third acute angle a3', a degree of the sixth acute angle a6' is greater than a degree of the fifth acute angle a5', and the degree of the fifth acute angle a5' is greater than a degree of the fourth acute angle a4'.

In an exemplary embodiment shown in FIG. 8, the degree of the first to third acute angles a1', a2', and a3' increases as the distance of the main optical patterns TL3 and the light guide film LGF from the first incident surface LS1-1 decreases. In such an embodiment, the degree of the fourth to sixth acute angles a4', a5', and a6' increases as the distance of the main optical patterns TL3 and the light guide film LGF from the second incident surface LS1-2 decreases.

Accordingly, in such an embodiment, the deviation between the total reflection angles of a light LT0 is minimized by the main optical patterns TL3.

Although the exemplary embodiments of the disclosure have been described, it is understood that the disclosure should not be limited to these exemplary embodiments but various changes and modifications can be made by one ordinary skilled in the art within the spirit and scope of the disclosure as hereinafter claimed.

What is claimed is:

1. A display device comprising:
   a display panel;
   a light source which generates a light; and
   an optical component disposed adjacent to the display panel and the light source,
   wherein the optical component comprises:
      a light guide film having a light incident surface facing the light source, wherein the light guide film guides the light from the light source to the display panel; and
      an optical sheet coupled to the light guide film to control a path of the light emitted from the light guide film,
   wherein the optical sheet comprises:
      a base film;
      main optical patterns disposed between the base film and the light guide film and coupled to the base film and the light guide film, wherein each of the main optical patterns comprises a side surface inclined with respect to the light guide film; and
      sub-optical patterns disposed between the base film and the light guide film, coupled to the base film, and spaced apart from the light guide film, wherein each of the sub-optical patterns comprises a side surface inclined with respect to the light guide film,
      wherein at least one of the sub-optical patterns is disposed between every two adjacent main optical patterns, the sub optical patterns being spaced apart from the main optical patterns and from each other.

2. The display device of claim 1, wherein each of the sub-optical patterns has a size smaller than a size of each of the main optical patterns.

3. The display device of claim 2, wherein a width of an overlapping area between each of the sub-optical patterns and the base film is smaller than a width of an overlapping area between each of the main optical patterns and the base film.

4. The display device of claim 2, wherein
   each of the main optical patterns has a width which decreases as a distance from the light guide film becomes less, and
   each of the sub-optical patterns has a width which decreases as a distance from the light guide film becomes less.

5. The display device of claim 4, wherein each of the main optical patterns comprises:
   a first upper surface in contact with the base film;
   a first lower surface opposite to the first upper surface and coupled to the light guide film;
   a first side surface which connects the first upper surface to the first lower surface; and
   a second side surface opposite to the first side surface and which connects the first upper surface to the first lower surface,
   wherein each of the first and second side surfaces is inclined with respect to the first upper surface and the first lower surface when viewed in a cross-sectional view, and
   the first side surface is inclined with respect to a direction substantially crossing the second side surface when viewed in a cross-sectional view.

6. The display device of claim 4, wherein each of the sub-optical patterns comprises:
   a second upper surface in contact with the base film;
   a second lower surface opposite to the second upper surface and spaced apart from the light guide film;
   a third side surface which connects the second upper surface to the second lower surface; and
   a fourth side surface opposite to the third side surface and which connects the second upper surface to the second lower surface,
   wherein each of the third side surface and the fourth side surface is inclined with respect to the second upper surface and the second lower surface when viewed in a cross-sectional view, and
   the third side surface is inclined in a direction substantially crossing the fourth side surface when viewed in a cross-sectional view.

7. The display device of claim 6, wherein the second lower surface of each of the sub-optical patterns is spaced apart from the light guide film such that an air layer is defined between the second lower surface and the light guide film.

8. The display device of claim 1, wherein a sub-optical pattern of the sub-optical patterns is disposed between two main optical patterns, which are adjacent to each other, of the main optical patterns when viewed in a plan view.

9. The display device of claim 8, wherein each of the main optical patterns and each of the sub-optical patterns have a dot shape when viewed in the plan view.

10. The display device of claim 8, wherein the sub-optical patterns have a density greater than a density of the main optical patterns in a unit area of the light guide film.

11. The display device of claim 1, wherein the optical component further comprises light condensing layers having a protrusion shape protruded from a rear surface of the light guide film.

12. The display device of claim 11, wherein each of the light condensing layers extends from the incident surface of the light guide film to an opposite surface of the light guide film facing the incident surface.

13. The display device of claim 12, wherein
   a lengthwise direction of each of the main optical patterns is substantially parallel to a lengthwise direction of the incident surface when viewed in a plan view, and
   a widthwise direction of each of the main optical patterns is substantially parallel to a lengthwise direction of each of the light condensing layers when viewed in a plan view.

14. The display device of claim 1, wherein the optical sheet further comprises a diffusion layer disposed on the base film and opposite to the main optical patterns, such that the base film is disposed between the diffusion layer and the main optical patterns.

15. The display device of claim 14, wherein
   the main optical patterns are arranged spaced apart from each other between the light guide film and the base film, and
   an air layer is defined between two main optical patterns, which are adjacent to each other, of the main optical patterns.

16. The display device of claim 1, wherein
the light source is disposed at a side of the optical component,
each of the main optical patterns comprises a side surface inclined with respect to the light guide film when viewed in a cross-sectional view, and
a degree of an acute angle between the side surface of each of the main optical patterns and the light guide film decreases as a distance thereof from an incident surface of the light guide film increases when viewed in the cross-sectional view.

17. The display device of claim 1, wherein
the light source is provided in a plural number,
the light sources are disposed corresponding to both sides of the optical component in a one-to-one correspondence to define a first incident surface and a second incident surface of the light guide film,
each of the main optical patterns comprises a side surface inclined with respect to the light guide film when viewed in a cross-sectional view, and
a degree of an acute angle between the side surface of each of the main optical patterns and the light guide film increases as a distance thereof from a line dividing the light guide film into two parts increases and a distance thereof from the first incident surface and the second incident surface decreases when viewed in the cross-sectional view.

18. An optical component comprising:
a light guide film; and
an optical sheet on the light guide film and which controls a path of a light from the light guide film,
wherein the optical sheet comprises:
  a base film;
  main optical patterns protruded to the light guide film, disposed between the base film and the light guide film, and coupled to the base film and the light guide film, wherein each of the main optical patterns comprises a side surface inclined with respect to the light guide film; and
sub-optical patterns disposed between the base film and the light guide film, coupled to the base film, and spaced apart from the light guide film, wherein each of the sub-optical patterns comprises a side surface inclined with respect to the light guide film,
wherein the sub-optical patterns are spaced apart from the main optical patterns and from each other,
wherein at least one of the sub-optical patterns is disposed between every two adjacent main optical patterns of the main optical patterns, and
wherein the main optical patterns are attached to the light guide film via an adhesive layer.

19. The optical component of claim 18, wherein
each of the main optical patterns has a width which decreases as a distance from the light guide film decreases, and
each of the sub-optical patterns has a width which decreases as a distance from the light guide film decreases.

20. The optical component of claim 18, wherein
each of the main optical patterns comprises a side surface inclined with respect to the light guide film when viewed in a cross-sectional view, and
a degree of an acute angle between the side surface of each of the optical patterns and the light guide film decreases as a distance thereof from a side surface of the light guide film increases when viewed in the cross-sectional view.

* * * * *